(12) United States Patent
Lu et al.

(10) Patent No.: US 9,712,349 B1
(45) Date of Patent: Jul. 18, 2017

(54) FFE-AIDED CDR TO CALIBRATE PHASE OFFSET AND ENHANCE GAIN IN BAUD RATE SAMPLING PHASE DETECTOR

(71) Applicant: Huawei Technologies Co., Ltd., Shenzhen (CN)

(72) Inventors: Yuchun Lu, Beijin (CN); Henry Wong, Ottawa (CA); Davide Tonietto, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/071,522

(22) Filed: Mar. 16, 2016

Related U.S. Application Data

(63) Continuation of application No. PCT/CN2016/074324, filed on Feb. 23, 2016.

(51) Int. Cl.
*H03K 5/159* (2006.01)
*H04L 25/03* (2006.01)
*H04L 5/00* (2006.01)

(52) U.S. Cl.
CPC ........ *H04L 25/03885* (2013.01); *H04L 5/006* (2013.01)

(58) Field of Classification Search
CPC ................. H04L 25/03057; H04L 25/03267

USPC ............................ 375/233, 232; 708/322, 323
See application file for complete search history.

(56) References Cited

U.S. PATENT DOCUMENTS

| | | | |
|---|---|---|---|
| 7,130,341 B2* | 10/2006 | Haunstein | H04L 25/03038 375/229 |
| 8,934,594 B1 | 1/2015 | Malhotra | |
| 2005/0135510 A1 | 6/2005 | Momtaz | |
| 2007/0274379 A1* | 11/2007 | Valliappan | H04B 3/143 375/232 |
| 2012/0257652 A1 | 10/2012 | Malipatil et al. | |
| 2014/0079111 A1* | 3/2014 | Hui | H04L 25/03044 375/234 |

* cited by examiner

*Primary Examiner* — Khai Tran
(74) *Attorney, Agent, or Firm* — Slater Matsil, LLP

(57) ABSTRACT

A system and method for Feed Forward. Equalizer (FFE)-Aided Clock Data Recovery (CDR) to calibrate phase offset and enhance gain in baud rate sampling phase detector is provided. In an embodiment, a clock data recovery (CDR) apparatus includes an incremental feed forward equalizer (INC-FFE) in a CDR path and a calibration component in an equalization path, the calibration component connected to the INC-FFE, the calibration component configured to adjust FFE coefficients for the INC-FFE according to a phase code (PC) index in a PC index table and one of a signal-to-noise-ratio (SNR) and a bit error rate (BER) of a sampled signal, wherein the PC index table comprises adjustment values for the FFE coefficients, and wherein the PC index is linearly related to a sampling phase.

16 Claims, 5 Drawing Sheets

| | PHASE CODE INDEX | PRE | MAIN | POS |
|---|---|---|---|---|
| 201 | ο ο ο | ο ο ο | ο ο ο | ο ο ο |
| 202 | -6 | C_pre + 3 | C_main | C_pos - 3 |
| 203 | -5 | C_pre + 2 | C_main | C_pos - 3 |
| 204 | -4 | C_pre + 2 | C_main | C_pos - 2 |
| 205 | -3 | C_pre + 1 | C_main | C_pos - 2 |
| 206 | -2 | C_pre + 1 | C_main | C_pos - 1 |
| 207 | -1 | C_pre | C_main | C_pos - 1 |
| 208 | 0 | C_pre | C_main | C_pos |
| 209 | 1 | C_pre - 1 | C_main | C_pos |
| 210 | 2 | C_pre - 1 | C_main | C_pos + 1 |
| 211 | 3 | C_pre - 2 | C_main | C_pos + 1 |
| 212 | 4 | C_pre - 2 | C_main | C_pos + 2 |
| 213 | 5 | C_pre - 3 | C_main | C_pos + 2 |
| 214 | 6 | C_pre - 3 | C_main | C_pos + 3 |
| 215 | ο ο ο | ο ο ο | ο ο ο | ο ο ο |

… (1)

FFE-AIDED CDR TO CALIBRATE PHASE OFFSET AND ENHANCE GAIN IN BAUD RATE SAMPLING PHASE DETECTOR

This application is a continuation of International Application No. PCT/CN2016/074324, filed on Feb. 23, 2016 which application is hereby incorporated by reference in its entirety.

TECHNICAL FIELD

The present invention relates generally to a system and method for clock data recovery in network devices, and, in particular embodiments, to a system and method for feed forward equalization aided clock data recovery.

BACKGROUND

In many technologies, digital data streams are transmitted without a clock signal. At the receiver end, the transmitted data has to be retrieved without losing its integrity with the accompanied timing information. In order to do this, the receiver generates a clock from an approximate frequency reference, and then phase-aligns to the transitions in the data stream with a phase-locked loop (PLL). This is referred to as clock-data recovery (CDR). A number of techniques have been developed to accomplish CDR. However, the existing techniques suffer from various disadvantages such as peak-to-peak jitter, inherent static phase offset, and inability to perform phase stepping.

SUMMARY

In accordance with an embodiment of the present invention, a clock data recovery (CDR) apparatus includes an incremental feed forward equalizer (INC-FFE) in a CDR path and a calibration component in an equalization path, the calibration component connected to the INC-FFE, the calibration component configured to adjust FFE coefficients for the INC-FFE according to a phase code (PC) index in a PC index table and one of a signal-to-noise-ratio (SNR) and a bit error rate (BER) of a sampled signal, wherein the PC index table comprises adjustment values for the FFE coefficients, and wherein the PC index is linearly related to a sampling phase.

In accordance with another embodiment of the present invention, a method for clock data recovery (CDR) includes determining a phase code (PC) index table comprising a plurality of PC indices, wherein each PC index corresponds to a value for each of a plurality of coefficient values for an incremental feed forward equalizer (INC-FFE); adjusting the coefficients of the INC-FFE according to values in the PC index table corresponding to a first index; determining one of a signal-to-noise ratio (SNR) and a bit error rate (BER) for a signal passing through the INC-FFE with coefficients adjusted according to the values in the PC index table corresponding to the first index; repeating the adjusting the coefficients and the determining one of the SNR and the BER steps until a one of the SNR and the BER has been obtained for each PC index in the PC index table; and calibrating the INC-FFE using the values in the PC index table corresponding to the PC index for which a best SNR or a best BER was obtained.

In accordance with another embodiment of the present invention, a network component includes a processor and a non-transitory computer readable storage medium storing programming for execution by the processor, the programming including instructions to: determine a phase code (PC) index table comprising a plurality of PC indices, wherein each PC index corresponds to a value for each of a plurality of coefficient values for an incremental feed forward equalizer (INC-FFE); adjust the coefficients of the INC-FFE according to values in the PC index table corresponding to a first index; determine one of a signal-to-noise ratio (SNR) and a bit error rate (BER) for a signal passing through the INC-FFE with coefficients adjusted according to the values in the PC index table corresponding to the first index; repeat the instructions to adjust the coefficients and to determine one of the SNR and the BER steps until a one of the SNR and the BER has been obtained for each PC index in the PC index table; and calibrate the INC-FFE using the values in the PC index table corresponding to the PC index for which a best SNR or a best BER was obtained.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figures 1, 2:
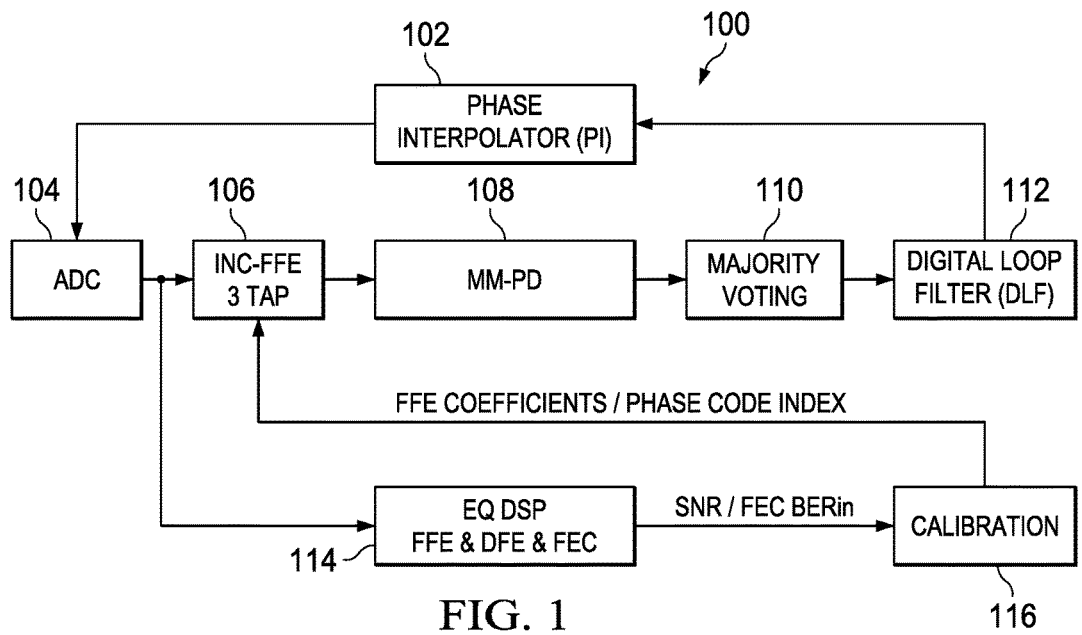
FIG. 1 is a diagram of an embodiment of a CDR system.
FIG. 2 is a diagram of an embodiment of a PC index table.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods for reliable and simple linear phase stepping in baud-rate CDR without dependence on conventional eye monitor. Various embodiments of the disclosure counteract the impact of the Continuous-Time Linear Equalizer (CTLE) Process, Voltage, and Temperature (PVT) variation on the sampling phase shift of baud rate CDR. Various embodiments provide a lock stable to the global optimal sampling phase using the information of equalizer Signal-to-Noise-Ratio (SNR) or pre-Forward Error Correction (FEC) Bit Error Rate (BER).

An embodiment of the disclosure provides systems and methods for CDR that achieve stable linear-phase stepping in baud-rate CDR circuits. An embodiment system and method for CDR counteracts the impact of CTLE equalizer PVT variation. An embodiment system and method enhances the phase-detector gain by using a Feed Forward Equalizer (FFE) in the CDR loop. An embodiment system and method improves the overall BER performance through stable locking to the global optimal phase.

Prior art methods include Bang-Bang (BB) Phase Detector (PD)—oversampling, Mueller-Muller PD Baud-rate sampling, and several variants of the MM PD Baud-rate sampling. The BB PD—oversampling technique detects the edges of the pulse stream. However, BB-PD—oversampling has a dead zone which can impact peak-to-peak jitter. Furthermore, the oversampling circuit requires a high cost and power in high-speed Serializer/Deserializer (SerDes) implementation e.g., at 56 Gigabits per second (Gbps), 112 Gbps, as compared to the disclosed systems and methods. The MM PD Baud rate sampling has an inherent static phase offset and cannot perform phase stepping. One variant of MM PD Baud rate sampling replicates the CDR path. This is equivalent to oversampling with two Analog-to-Digital Converters (ADCs) and the replica of the CDR path increases the complexity of the circuit. Another variant of MM PD Baud-rate sampling samples the data error with another sampler which is skewed with respect to the sampling phase of the data. The data error sampler is used as an eye sampler to monitor an eye diagram. This is also equivalent to oversampling with two ADCs and suffers under severe ISI scenario and has no open "EYE." Yet another variant of the MM PD Baud-rate sampling adds fixed values with the adapted pos1 Decision Feedback Equalizer (DFE) coefficients. However, this technique is not applicable for short channels since the pre-cursor is small and it introduces an inherent phase offset in short channels. Furthermore, the CDR path is coupled with the equalizer (EQ) path and there is a risk of instability. Additionally, this variant cannot work without a DFE.

Disclosed herein are CDR systems that includes an incremental (INC)-FFE in the CDR path. In an embodiment, the INC-FFE is a 3 Tap INC-FFE. The INC-FFE can be used to calibrate the sampling phase linearly in Baud-rate CDR thereby providing Linear Phase Stepping in Baud Rate CDR. Furthermore, a method to counteract the impact of the CTLE PVT variation on the sampling phase shift of the CDR is disclosed. Additionally, a method to calibrate the sampling phase of Baud rate CDR to globally optimize the SNR or pre-FEC BER. Thus, in various embodiments, the disclosed methods and systems globally optimize the BER performance. One or more embodiments of the disclosure provide true Baud rate CDR without an additional ADC or additional sampler. Embodiments of the disclosure decouple the CDR path from the EQ path with little or no instability problems. In an embodiment, the cost of 3 Tap INC-FFE is minimal in the overall Digital Signal Processor (DSP) receiver implementation.

FIG. 1 is a diagram of an embodiment of a CDR system 100. CDR system 100 includes a phase interpolator (PI) 102, an ADC 104, an INC-FFE 106, a Mueller-Muller baud-rate Phase Detector (MM-PD) 108, a majority voting (MV) component 110, a digital loop filter (DLF) 112, an EQ DSP 114 for FFE and DFE, and a calibration component 116. The ADC 104 receives a serial data stream and converts the serial data stream from analog to digital. The digital output of the ADC 104 is provided as an input to the INC-FFE 106 and as an input to the EQ DSP 114. The INC-FFE 106 provides an equalized signal to the MM-PD 108. The MM-PD 108 receives the equalized signal from the INC-FFE and executes a Mueller-Muller (MM) baud-rate Phase Detector (PD) algorithm. The MV 110 receives the output from the MM-PD 108 and converts an array of "early/hold/late" information to a single entry of "early/hold/late" information. For example, if the MM-PD 108 provides 32 "early/hold/late" information per cycle, the MV 110 will select early if more than 16 of them are early, select late if less than 16 of them are late, and will select hold if the number of early and late are equal. The DLF 112 receives the output from the MV 110. The DLF 112 is a digital filter that converts the early/hold/late" information provided by the MV 110 into a real action of the clock phase calibration. The PI 102 receives an output from the DLF 112 and adjusts the phase of the signal. The output of the PI 102 is supplied to the ADC 104.

The EQ DSP 114 receives the digital signal from the ADC 104 and determines an SNR or an FEC BERin and provides the SNR or the FEC BERin to the calibration component 116. The calibration component 114 includes a phase code (PC) Index. An example of a PC Index is provided in FIG. 2 and is described in more detail below.

In an embodiment, the calibration component 116 operates in two modes. In a startup mode, the calibration unit 116 scans the INC-FFE Look Up Table (LUT) or uses Least Mean Squares (LMS) adaption to obtain the INC-FFE coefficients at PC Index 0. The coefficients are labeled C_pre, C_main, and C_pos. In an embodiment, the LUT is located in the calibration unit 116. In an embodiment, the LUT resides in memory and may be configured by software. The contents of the LUT may be determined by off-line simulation or by experiment. For example, in an embodiment, the channels are scanned with different insertion loss from 10 dB to 40 dB with a step of 2 dB for a total of 16 settings in order to obtain a substantially best INC-FFE index 0 settings for each insertion loss channel, i.e., C_pre, C_main, and C_pos. In an embodiment, the LUT is scanned to adjust the INC-FEC settings to each of the settings in the LUT and the SNR or FEC BERin are monitored for each setting in the LUT to find the setting with the best performance. In the start-up mode, the INC-FEC settings at PCindex=0 is chosen, i.e., C_pre, C_main, and C_pos. After determining the coefficients at PC Index 0, the calibration component 116 determines the FFE coefficients for the remaining indexes in the PC index. In an embodiment, the PC index is indexed from −6 to 6 in integer steps. In an embodiment, C_main remains the same for all indexes, but the C_pre and/or C_pos values change for different index values. After the startup mode is completed and the PC index is determined, the INC-FFE coefficients for the INC-FFE 106 are adjusted by stepping through the PC Index. The corresponding SNR or FEC BERin is recorded for each index value. After values for the SNR or the FEC BERin for each index value have been obtained, the calibration component 116 adjusts the INC-FFE coefficients using the Pre, Main, and Pos corresponding to the index value for which the best SNR or best FEC BERin was obtained.

In an embodiment, a new PC index is created using a new C_main obtained from a pre-defined safe range and the procedure for obtaining an index value for the new PC index for which a best SNR or best FEC BERin is obtained is repeated. The "safe range" for the PCindex is a region in which the PCindex maintains a linear relationship with the sampling phase offset. In an embodiment, the "safe range" is configurable and can be determined by off-line simulation or by measurement under channels with different insertion losses. The C_pre, C_main, and C_pos are determined during start up mode and this is the INC-FFE setting for the PCindex=0 case. In mission mode, the calibration algorithm will adjust the PCindex settings in a perturbation manner around the PCindex=0 to determine the best settings. This perturbation procedure can be repeated as desired in a particular implementation. For example, let Current PC index value as CurrPCindex, the algorithm will choose three PCindex settings, i.e. CurrPCindex+[−1, 0, +1], and monitor the SNR/FEC BERin for these three adjacent settings. The best SNR or lowest FEC BERin is selected to update the CurrPCindex. For example, if CurrPCindex+1 setting has the best performance, the CurrPCindex will update to CurrPCindx+1. Note, the INC-FFE 106 coefficients are translated from the CurrPCindex value to the real settings as shown in FIG. 2.

The safe range is channel dependent. Thus, for a specific channel, there will be optimal C_pre, C_main, and C_pos values. As long as C_pre, C_main, and C_pos are selected, the safe range is fixed and these values may be obtained from simulation or experiments and pre-stored. For example, in FIG. 6, described below, the safe range of the PCindex is from −10 to +6.

The start start-up mode is the process of selecting C_pre, C_main, and C_pos. Once the C_pre, C_main, and C_pos have been selected, then the system moves to mission-mode. The mission-mode calibration is based on the C-pre, C_main, and C_pos selected in the start-up mode. Thus, Pre, Main, and Pos equal C_pre, C_main, and C_pos, respectively for PCindex=0. Then in the mission mode calibration, the PCindex is the only indicator used to perform the phase stepping. The change of PCindex will result in the change in Pre, Main, Pos according to FIG. 2. After this, the sampling phase is tuned.

Thus, in start-up mode, the pre-stored. C_pre, C_main, and C_pos tables are scanned and the BER or SNR is monitored. The best C_pre, C_main, and C_pos are selected for a current channel. In an embodiment, the start-up mode may be an exhaustive scan of all possible C_pre, C_main, and C_pos in the table. The PCindex is adjusted as the only entry for phase stepping. For example, assume CurrPCindex is the current PCindex. Then try three indices, e.g., CurrPCindex+index −1, CurrPCindex+index 0, and CurrPCindex+index+1. The SNR and/or FEC BERin are monitored for each of these three adjacent settings. The best SNR or lowest BEF BERin is selected to update the CurrPCindex. In an embodiment, usually, the PCindex may bounce back and forth around an optimal value, e.g., PCindex=0. If the PCindex hits the safe range boundary, the CurrPCindex update may be restarted. Note, in an embodiment, an exhaustive scan cannot be performed in mission-mode because it may impact the Serdes function.

FIG. 2 is a diagram of an embodiment of a PC index table 200. The PC index table 200 includes a plurality of code indices 201. In an embodiment, the indices 201 are symmetrically indexed around a central index 0 which corresponds to entries for C_pre, C_main, and C_pos as obtained as described above. In an embodiment, PC index 0 includes the entries for C_pre, C_main, and C_pos as obtained from the INC-FFE (LUT) or LMS adaption as described above. The entries for the PC index −1 are obtained by subtracting one from the C_pos entry for PC index −1 while the C_pre and C-main remain unchanged from the entry for PC index 0. The entries for the PC index −2 are obtained by adding 1 to the C_pre while the C_main and C_pos remain the same as in PC index −1. The remaining entries for PC indices −3 through 6 are obtained in a similar manner by alternately subtracting one from the previous value of C_pos or adding one to the previous value of C-pre. The entries for the indices 1 through 6 are obtained in a similar manner as for the indices −1 through −6 except that 1 is subtracted from the previous value of C_pre for alternating indices while 1 is added to the previous value of C_pos for alternating indices as shown in FIG. 2. C_main remains the same for all indices of the PC index table 200.

In the depicted example, the PC index table 200 includes coefficients for indices values from −6 to 6, but any number of indices may be utilized in other embodiments. In an embodiment, the number of indices is limited by the speed with which a solution for the coefficients for INC-FFE is desired to be obtained.

Returning now to FIG. 1, in an embodiment, the calibration component 116 steps through the PC index table 200 such that the calibration component 116 adjusts the coefficients of the INC-FFE 106 according to the values for the entries corresponding to one index, records the value of the SNR or FEC BERin for that index, and then moves the next index in the PC index table 200 and repeats the previous procedure until SNR values or FEC BERin values are obtained for each index in the PC index table 200. In an embodiment, less than all of the PCindex settings are scanned, i.e., the PCindex is scanned in a perturbation manner such that a CurrPCindex and two adjacent settings around the CurrPCindex (+1 or −1) and the best of these three settings is selected. The CurrPCindex is updated according to the best setting and the procedure is repeated until, for example, a change in the SNR or ITC BERin between a CurrPCindex and a previous CurrPCindex is less than a predetermined amount. The values of Pre, Main, Pos corresponding to the index having the best SNR or best FEC BERin are selected to use for the adjusting the coefficients of the INC-FFE 106. Adjusting the coefficients of the INC-FFE 106 fine tunes the output of the MM-PD 108 since the phase of signal is slightly offset by the INC-FFE 106.

Figure 3:
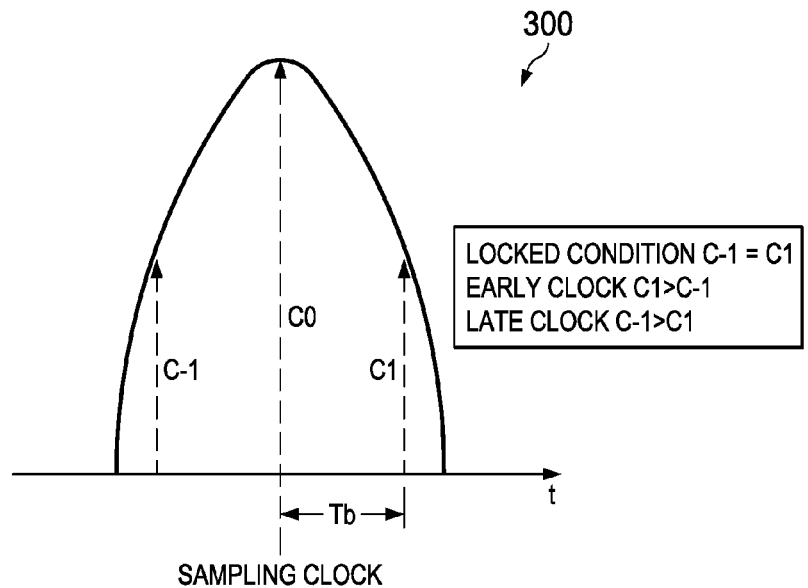
FIG. 3 is a diagram of sampling clock pulse with early-late information in a Mueller Muller algorithm.

FIG. 3 is a diagram of sampling clock pulse 300 with early-late information in a Mueller Muller algorithm. C0 corresponds to the locked condition where C−1=C1. Early clock is C1>C−1 and late clock is where C−1>C1. Tb is the offset of C1 with respect to C0. By adjusting the coefficients of the INC-FFE 106, the C−1 and C1 positions can be made not to equal each other thereby forcing the MM-PD to move the position of C0 resulting in a better CDR as compared to a system without the INC-FFE 106.

Figure 4:
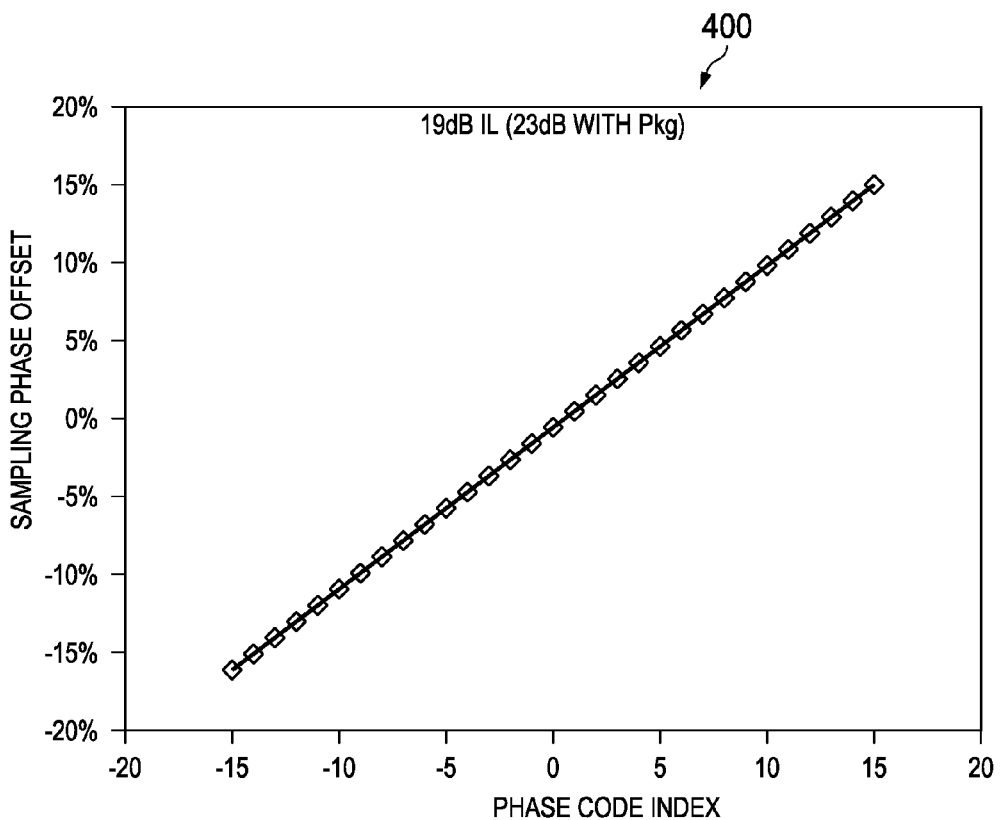
FIGS. 4-6 are graphs of simulation results for closed-loop simulation at 56 Gbps Pam-4 with impairments such as, noise, jitter, quantization, etc. considered.
Figure 5:
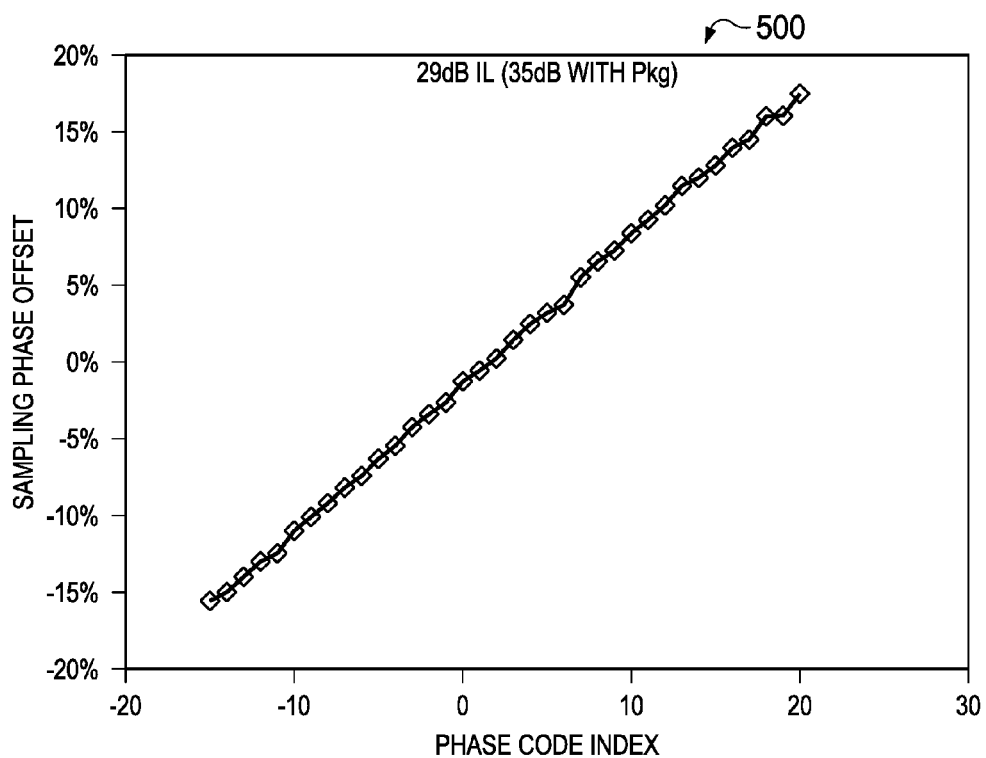
Figure 6:
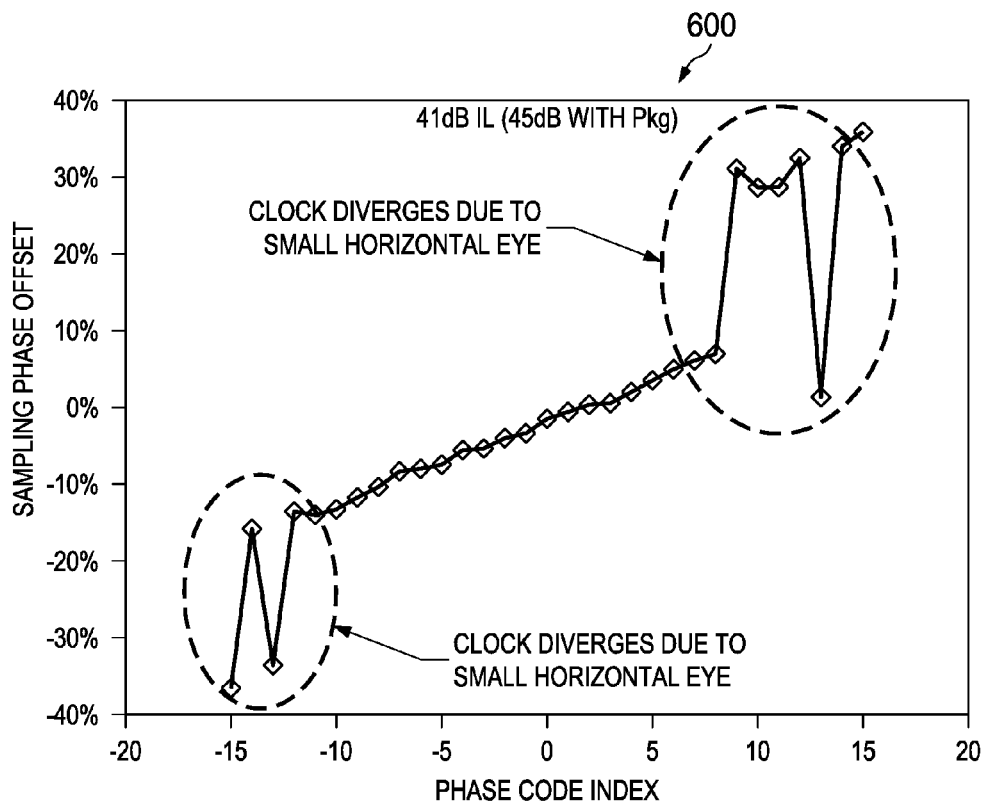

FIGS. 4-6 are graphs of simulation results for closed-loop simulation at 56 Gbps PAM-4 with impairments such as, noise, jitter, quantization, etc. considered. Graph 400 in FIG. 4 shows the sampling phase offset as a function of phase code index for 19 dB insertion loss (IL) (23 dB with packaging (Pkg). IL is defined at the Nyquist frequency. Graph 500 in FIG. 5 shows the sampling phase offset as a function of phase code index for 29 dB IL (35 dB with Pkg). Graph 600 in FIG. 6 shows the sampling phase offset as a function of phase code index for 41 dB IL (45 dB with Pkg). As can be seen from these graphs 400, 500, 600, the phase code index is not only monotonic, but also has a linear relationship with respect to the FFE and MM-PD locking phase. The clock diverges from linear in graph 600 only on the extremities of the phase code index due to the small horizontal eye. The safe range for this setting is from −10 to +5 and can be obtained from simulation or from experimental measurement. In an embodiment, the Phase Code Index can be configured to exclude the settings that cause the CDR to lose lock.

Figure 7:
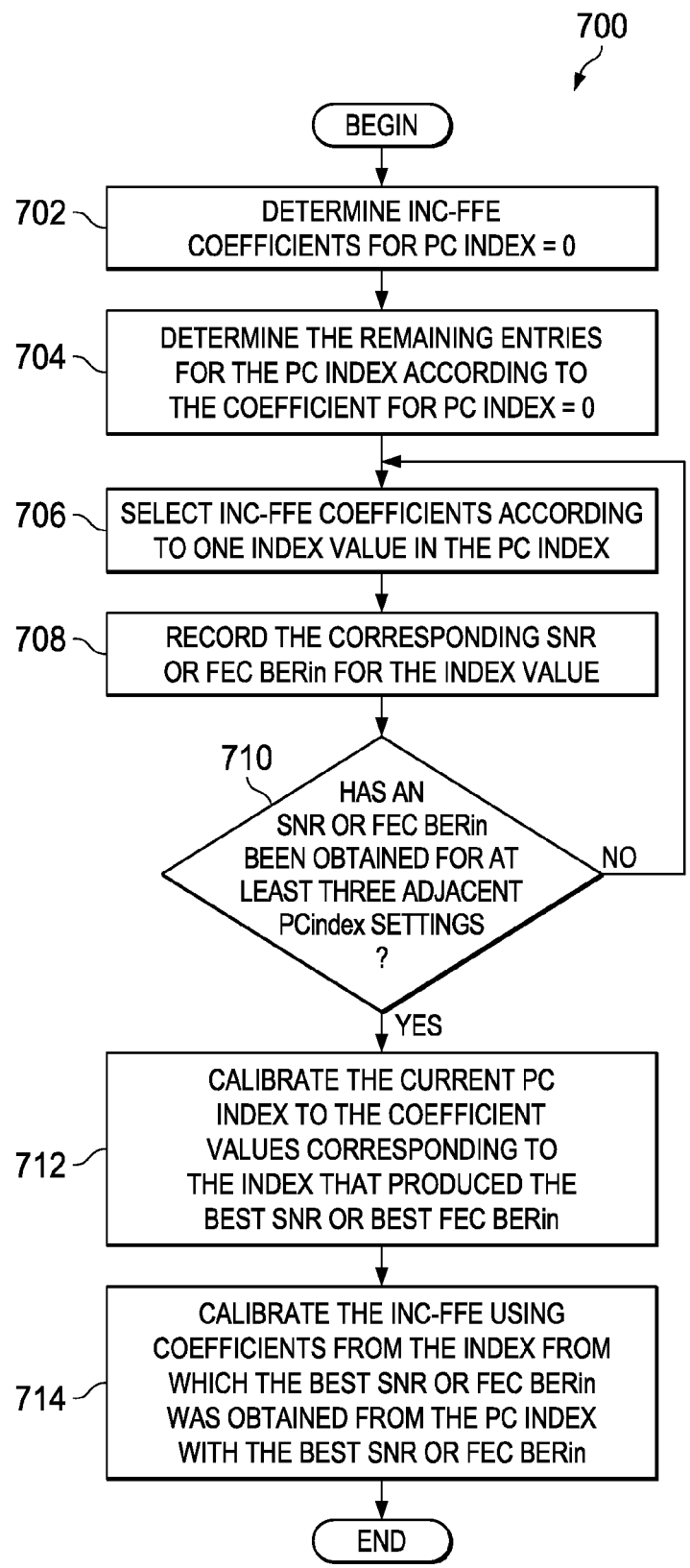
FIG. 7 is a flowchart illustrating an embodiment of a method for performing clock data recovery.

FIG. 7 is a flowchart illustrating an embodiment of a method 700 for performing clock data recovery. The method 700 is a mission mode method. The method 700 begins at block 702 where a calibration component determines INC-FFE coefficients for PC index=0 for a PC index table. At block 704, the calibration component determines the remaining entries for the PC index table according to the coefficient for PC index=0. At block 706, the calibration component selects INC-FFE coefficients according to one index value in the PC index table and adjusts the INC-FFE accordingly. At block 708, the calibration component records the corresponding SNR or the corresponding FEC BERin for the index value and at block 710, the calibration component determines whether an SNR or an FEC BERin has been obtained for at least three adjacent PCindex settings. For example, in an embodiment, the calibration proceeds around three adjacent PCindex settings, i.e., CurrPCIndex+[−1, 0, +1]. For each calibration loop, (e.g., blocks 706, 708, 710), the setting with the best performance is selected. For example, in FIG. 2, the PC index values range from −6 to 6. Thus, in FIG. 2, the SNR or FEC BERin for the combination of C_pre, C_main, and C_pos corresponding to each of the PC index values −6 to 6 are determined. If at block 710, the calibration loop has not been completed, then the method 700 proceeds back to block 706. If, at block 710, the calibration component determines that the calibration loop has been completed, then the method 700 proceeds to block 712 where the calibration component calibrates the current PC index table to use the coefficient values corresponding to the index that produced the best SNR or the best FEC BERin. At block 718, the calibration component calibrates the INC-FFE using the coefficients from the index from which the best SNR or FEC BERin was obtained from the PC index table with the best SNR or FEC BERin, after which, the method 700 ends. In an embodiment, the method 700 may be continuously performed to calibrate the PVT continuously. It should be noted that in some embodiments, only a single PC Index table is utilized.

In an embodiment, for usage of the "safe range," if the calibration of PCindex hits the boundary of the "safe range," one of two options may be selected. In option 1, the method 700 always selects values within the "safe range." In option 2, the method 700 restarts the block 702 to find new C_pre, C_main, and C_Pos.

Figure 8:
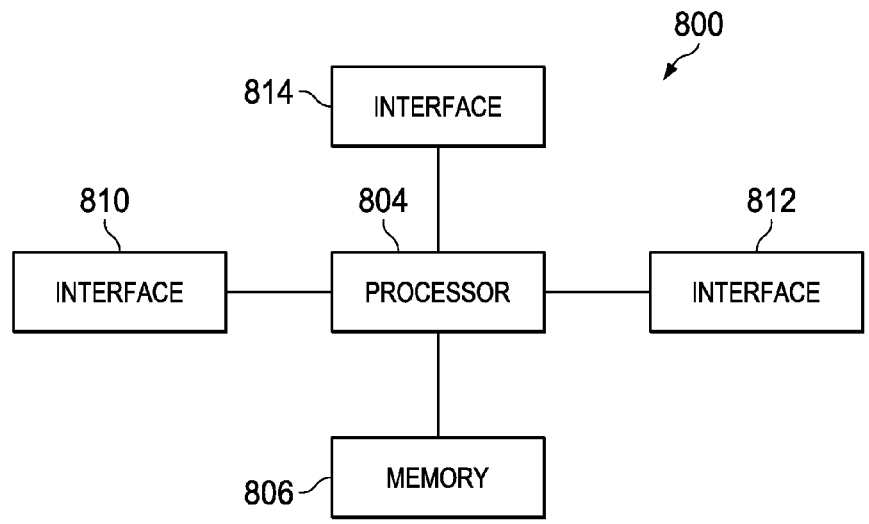
FIG. 8 illustrates a block diagram of an embodiment processing system for performing methods described herein, which may be installed in a host device.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 810, 812, 814 connects the processing system 800 to a transceiver adapted to transmit and receive signaling over the telecommunications network.

Figure 9:
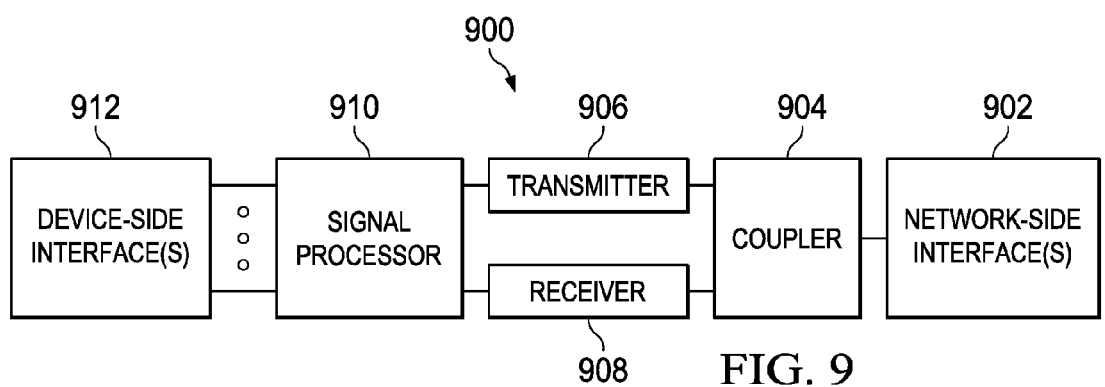
FIG. 9 illustrates a block diagram of a transceiver adapted to transmit and receive signaling over a telecommunications network.

FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A clock data recovery (CDR) apparatus, comprising:
   an incremental feed forward equalizer (INC-FFE) in a CDR path; and
   a calibration component in an equalization path, the calibration component connected to the INC-FFE, the calibration component configured to repeatedly adjust FFE coefficients for the INC-FFE according to a phase code (PC) index in a PC index table and one of a signal-to-noise-ratio (SNR) and a bit error rate (BER) of a sampled signal until a one of the SNR and the BER has been obtained for each PC index in the PC index table, the calibration component further configured to calibrate the INC-FFE using values in the PC index table corresponding to the PC index for which a best SNR or a best BER was obtained, wherein the PC index table comprises adjustment values for the FFE coefficients, and wherein the PC index is linearly related to a sampling phase.

2. The CDR apparatus of claim 1, wherein the PC index comprises values for incremental adjustments to the FFE coefficients in a predetermined range.

3. The CDR apparatus of claim 1, wherein the INC-FFE comprises three taps and the FFE coefficients comprise three FFE coefficients.

4. The CDR apparatus of claim 3, wherein each index of the PC index table comprises a value for each of three FFE coefficients.

5. The CDR apparatus of claim 1, wherein the calibration component is configured to determine one of a SNR and a BER for a plurality of entries in the PC index table and adjust the FFE coefficients according to the entries in the PC index table that produce the best one of the SNR and the BER.

6. The CDR apparatus of claim 1, wherein the PC index table comprises a plurality of PC index tables, wherein the calibration component is configured to determine one of an SNR and a BER for a plurality of entries in the plurality of PC index tables, and wherein the calibration component is configured to determine adjustments to the FFE coefficients according to the entries in the PC index from the PC index table that produces the best one of the SNR and the BER.

7. A method for clock data recovery (CDR), the method comprising:
   determining a phase code (PC) index table comprising a plurality of PC indices, wherein each PC index corresponds to a value for each of a plurality of coefficient values for an incremental feed forward equalizer (INC-FFE);
   adjusting the coefficients of the INC-FFE according to values in the PC index table corresponding to a first index;
   determining one of a signal-to-noise ratio (SNR) and a bit error rate (BER) for a signal passing through the INC-FFE with coefficients adjusted according to the values in the PC index table corresponding to the first index;
   repeating the adjusting the coefficients and the determining one of the SNR and the BER steps until a one of the SNR and the BER has been obtained for each PC index in the PC index table; and
   calibrating the INC-FFE using the values in the PC index table corresponding to the PC index for which a best SNR or a best BER was obtained.

8. The method of claim 7, wherein the PC index comprises values for incremental adjustments to the FFE coefficients in a predetermined range.

9. The method of claim 7, wherein the INC-FFE comprises three taps and the FFE coefficients comprise three FFE coefficients.

10. The method of claim 9, wherein each PC index of the PC index table comprises a value for each of three FFE coefficients.

11. The method of claim 7, wherein the PC index table comprises a plurality of PC index tables, wherein the method further comprises:
    determining one of a SNR and a BER for a plurality of entries in the plurality of PC index tables; and
    determining adjustments to the FFE coefficients according to the entries in the PC index from the PC index table that produces the best one of the SNR and the BER.

12. A network component, comprising:
    a processor; and
    a non-transitory computer readable storage medium storing programming for execution by the processor, the programming including instructions to:
    determine a phase code (PC) index table comprising a plurality of PC indices, wherein each PC index corresponds to a value for each of a plurality of coefficient values for an incremental feed forward equalizer (INC-FFE);
    adjust the coefficients of the INC-FFE according to values in the PC index table corresponding to a first index;
    determine one of a signal-to-noise ratio (SNR) and a bit error rate (BER) for a signal passing through the INC-FFE with coefficients adjusted according to the values in the PC index table corresponding to the first index;
    repeat the instructions to adjust the coefficients and to determine one of the SNR and the BER steps until a one of the SNR and the BER has been obtained for each PC index in the PC index table; and
    calibrate the INC-FFE using the values in the PC index table corresponding to the PC index for which a best SNR or a best BER was obtained.

13. The network component of claim 12, wherein the PC index comprises values for incremental adjustments to the FFE coefficients in a predetermined range.

14. The network component of claim 12, wherein the INC-FFE comprises three taps and the FFE coefficients comprise three FFE coefficients.

15. The network component of claim 14, wherein each PC index of the PC index table comprises a value for each of three FFE coefficients.

16. The network component of claim 12, wherein the PC index table comprises a plurality of PC index tables and wherein the programming further comprises instructions to:
    determine one of a SNR and a BER for a plurality of entries in the plurality of PC index tables; and
    determine adjustments to the FFE coefficients according to the entries in the PC index from the PC index table that produces the best one of the SNR and the BER.

* * * * *

UNITED STATES PATENT AND TRADEMARK OFFICE
CERTIFICATE OF CORRECTION

PATENT NO. : 9,712,349 B1
APPLICATION NO. : 15/071522
DATED : July 18, 2017
INVENTOR(S) : Yuchun Lu et al.

Page 1 of 1

It is certified that error appears in the above-identified patent and that said Letters Patent is hereby corrected as shown below:

On the Title Page

Item (72) Inventors, Line 1, delete "Beijin" and insert --Beijing--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*